May 14, 1968 L. J. MELHART 3,382,785
PULSED EDDY CURRENT MOTIVATED SHUTTER

Filed Nov. 30, 1965 2 Sheets-Sheet 1

INVENTOR
LEONARD J. MELHART

BY *[signature]* AGENT
*[signature]* ATTORNEY

May 14, 1968 L. J. MELHART 3,382,785
PULSED EDDY CURRENT MOTIVATED SHUTTER
Filed Nov. 30, 1965 2 Sheets-Sheet 2

INVENTOR
LEONARD J. MELHART

BY AGENT
ATTORNEY 3,382,785
PULSED EDDY CURRENT MOTIVATED
SHUTTER
Leonard J. Melhart, 6511 Abbington Drive,
Oxon Hill, Md. 20021
Filed Nov. 30, 1965, Ser. No. 510,709
5 Claims. (Cl. 95—53)

ABSTRACT OF THE DISCLOSURE

This invention is directed to a fast operating shutter in which shutter motion is produced by eddy currents built up in the shutter. A magnetic field producing coil forces the shutter away from the coil when excited by a capacitor source. The construction of the housing within which the shutter operates acts to stop the shutter by trapped air such as by a dashpot.

---

The invention described herein may be manufactured and used by or for the Government of the United States of America for governmental purposes without the payment of any royalties thereon or therefor.

The present invention relates to an ultra fast magnetic motivated shutter and more particularly to a pulsed eddy current motivated shutter functioning in the microsecond time range.

Heretofore shutters have been actuated by means of a solenoid acting on an armature which in turn acts on the shutter blades through gear linkages and other mechanical movements. Another type involves the rotating slit. Another type is directed to an explosive blast which forces the shutter due to an explosion. Still another type is one operable by use of a compression foil wherein the foil is magnetically squeezed to close an aperture. The above different types have various drawbacks such as not being fast enough, difficult to synchronize, hazardous and/or a one-shot device. Further problems are brought about by use of prior art devices wherein no structure is provided for impeding the movement of a shutter such that damage may be done to the shutter.

The disadvantages encountered in prior art shutters are overcome by the present invention in which the shutter is made to move by action of eddy currents in the base of the shutter element due to electrical current in an adjacent coil. The shutter is directed axially away from the electrical coil field and a dashpot or any other type of mechanism is provided to slow the device down. Additionally a friction stop mechanism is provided to hold the shutter until released by hand or some other mechanism.

An object of the present invention is to devise an eddy current driven shutter which will accurately operate at a specifically desired moment.

Another object is to devise an eddy current driven shutter that will operate for a precisely determined interval of time.

A further object is to devise an eddy current shutter that has a rapid response.

Still another object is to provide a shutter which may be synchronized with another electrical event.

While still another object is to provide a cushion of air to stop the shutter movement.

Yet another object of the invention is to provide a stop-and-release mechanism for convenient control and repeatable operation of the shutter device.

Other objects and many of the attendant advantages of this invention will be readily appreciated as the same becomes better understood by reference to the following detailed description when considered in connection with the accompanying drawing wherein:

FIG. 5 illustrates a conductive coil for accelerating the shutter of the device shown in FIG. 4;

Figure 1:
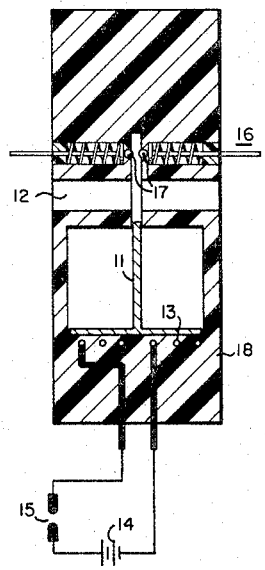
FIG. 1 is an end view illustrating the device connected with an electrical power source.
Figure 2:
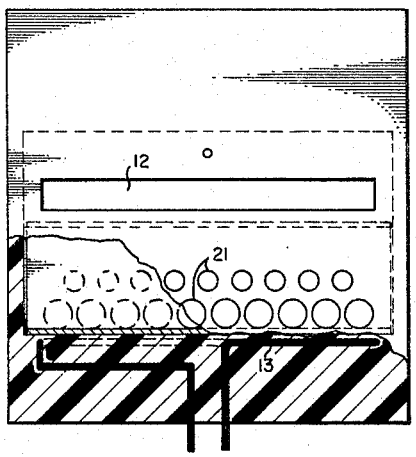
FIG. 2 is a front view of the device.
Figure 3:
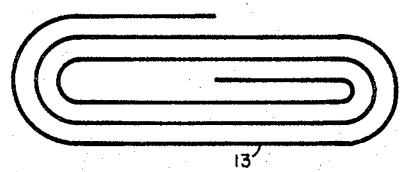
FIG. 3 illustrates the electrical conductor for the device, which forces the shutter across the aperture.

Referring now to the drawing wherein like reference characters designate like or corresponding parts throughout the different views, there is shown by illustration in FIG. 1 a T-shaped shutter 11 which is operated to obstruct light or allow light to pass through aperture 12. The shutter is actuated by means of a coil 13 which is positioned under the metallic base of the T-shaped shutter and encased within an insulating material 18. The coil is actuated by a suitable electrical power supply such as a capacitor 14, which is charged by any suitable means. The capacitor discharge is controlled by a spark gap switch 15 or any other suitable switch, and the low inductance electrical lines from the switch and the capacitor are accordingly connected to the inner and the outer ends of the coil 13. A spring-loaded ball assembly 16 is positioned on the opposite side of the aperture from the T-shaped shutter such that in operation the shutter arm crosses the aperture and is forced between the two ball bearings 17 of the assembly wherein the shutter is held in position by the spring-loaded ball-bearing assembly. The spring-loaded ball assembly also operates as a release mechanism such that the shutter can be released and returned to its original position by movement of the ball assembly which releases the shutter blades.

In order to prevent damage to the shutter at the end of its run, an air dashpot assembly is used as a brake to cushion the stoppage of the shutter. The air dashpot chamber is provided with apertures or holes 21 in the lower section thereof such that as the shutter is driven toward the hold-and-release mechanism, air escapes through the apertures. As the stem portion of the shutter passes beyond the apertures in the air dashpot chamber, the base portion of the shutter traps air in the dashpot chamber such that the air therein forms a cushion stop for the shutter. Thus the shutter is protected against damage and may be used several times.

It is a well-known phenomena that a current through a flat spiral coil will set up eddy currents in an adjacent metal plate in a direction opposite to that of the coil and hence generate opposing magnetic fields resulting in strong repulsive forces. Thus a capacitor discharge through the spark gap switch is directed to the coil through low inductance connections which carry the current to the coil. The current flow through the coil produces the magnetic field and sets up eddy currents in the coil and in the metallic base of the shutter. The magnetic field generated in the coil and in the shutterhead produces repulsive forces which cause the shutter to move rapidly away from the coil. In moving away from the coil, the shutter stem crosses the aperture 12 to close off any light therethrough. Portholes or apertures in the shutter element enclosure or dashpot permit air to escape until the head portion of the shutter moves beyond the apertures then serves as an air cushion to stop the lightweight shutter. The friction stop and hold mechanism holds the shutter at the top until released by release of the springball mechanism.

The shutter speed will depend upon the following:

(1) The electrical period of discharge;
(2) The aperture size; and
(3) The mass of the moving element.

Values at which the system operates may include a capacitor of from 0.01 to 1 mfd. and a power source of from about 10,000 to 20,000 volts.

Figure 4:
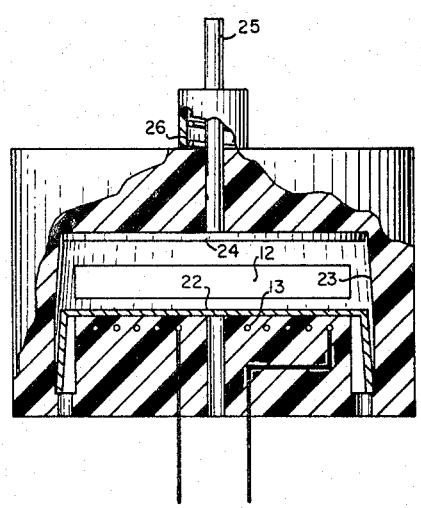

The modification as shown in FIG. 4 operates substantially a the device shown in FIG. 1. The housing is provided with a shutter opening 12 across which a metallic bowl-shaped shutter 22 is propelled by a magnetic force produced by a coil 13 positioned below the bowl-shaped shutter. Positioned above and about the shutter opening is a stop-and-hold mechanism 23 formed by the housing body and which has the same configuration as the shutter with a slightly larger size such that the shutter is propelled into the cuplike stop mechanism. Since the stop mechanism is only slightly larger than the shutter, the shutter is forced into the upper cuplike stop mechanism and is held there after closing the shutter opening. A disc-shaped member 24 is positioned in the upper side of the cuplike member and is provided with a plunger 25 which extends outwardly from the housing to provide a mechanism by which the shutter is forced back into its normal open position. The plunger is provided with a spring mechanism 26 which returns the plunger back to its proper position after forcing the shutter back into its normal open position. The cup-shaped stop mechanism has apertures therethrough in alignment with the shutter aperture such that as the shutter is moved upward into the stop mechanism, air escapes through the opening therein. Once the bowl-shaped shutter passes beyond the opening in the stop mechanism an air cushion at the top is created because there are no available openings for the escapement of air; therefore, the cupshaped stop mechanism also provides an air cushion for the shutter mechanism. The shutter mechanism is propelled or operated in the same method as described above for the shutter mechanism in the device as shown in FIG. 1.

Figure 6:
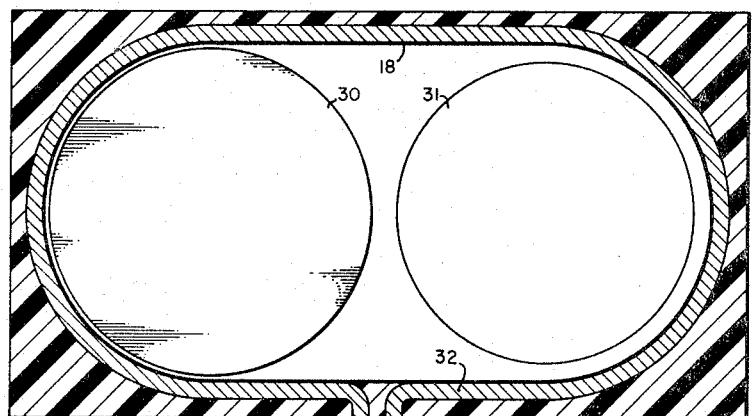
FIGS. 6 and 7 illustrate other modifications.

FIG. 6 illustrates a modification of the device shown in FIG. 1. FIG. 6 includes a circular shaped metallic shutter 30 which is magnetically propelled or forced over an aperture 31 by a coil which surrounds the shutter. The coil is in a somewhat oval shape wherein the shutter moves within the confines of the coil.

Figures 7, 8:
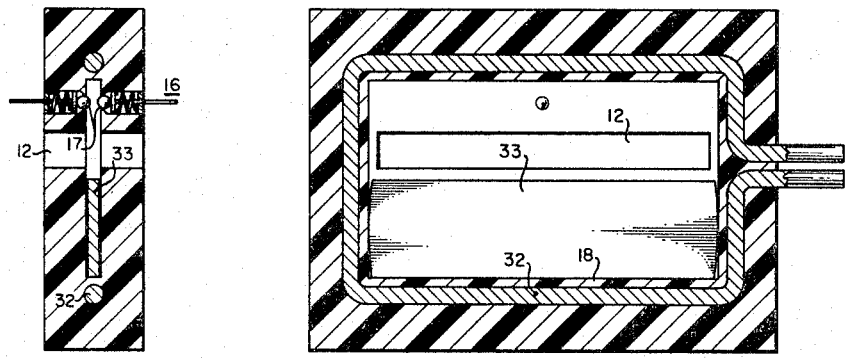
FIG. 8 is a cross-sectional view of the device shown in FIG. 7.
Figure 5:
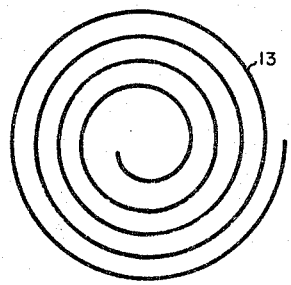
FIG. 5 illustrates a cross-sectional view of a modification of the device shown in FIG. 1.

FIG. 7 is directed to a modification in which a thin rectangular metallic shutter is forced across an aperture 12 by use of a rectangular shaped coil within which the shutter moves. As shown in FIG. 8, the shutter is held in place by a spring pressed ball assembly. However, if the shutter is forced along a line in a horizontal direction, the holding means would not be necessary.

In operation, the shutter assembly is readied for operation by setting the shutter adjacent to the coil as shown in FIGS. 1 and 4 and near one side as shown in FIGS. 6 and 7. The capacitor is charged and then when ready, a switch is closed to complete the circuit. The capacitor discharges to set up a current in the coil. The current through the coil produces eddy currents in the metallic shutter. A magnetic field is produced by the current in the coil and a reverse magnetic field is produced in the shutter. The repulsive forces of the two magnetic fields forces the shutter across the opening. The dashpot (FIG. 1) stops the shutter to prevent any damage thereto and the shutter is held in place by the holding means until released. The shutter can then be set for another event.

The operation of the shutter can be controlled to coincide with another event by electrical controls such that the shutter is activated at a specific time relative to a desired event.

The operation has been explained wherein the shutter closes a slit. The device could be operated by the same principle to open a slit wherein the shutter in its normal position covers an opening and upon operation the shutter opens the slit. Further, the shutter could be made to open a slit and then by further movement close the slit for a timed opening of a shutter. In the modification shown by FIGS. 6 and 7, one side of the shutter is closer to the coil than other side, therefore the shutter is forced away from the nearby coil. The discharge through the capacitor is so fast that the magnetic field about the coil opposite from the shutter collapses before the shutter reaches that side, therefore the shutter is not forced back.

The shutter and coil may take any desired shape without departing from the scope of the invention. The important feature is that the shutter be positioned relative to the coil such that eddy currents are built up within the shutter and that the magnetic field produced about the coil has a driving force on the shutter.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. An eddy current motivated shutter device which comprises:
    a stationary shutter guide means;
    a light aperture passing through said shutter guide means;
    a shutter positioned for movement within said shutter guide means to close off said aperture when in one position and to open said aperture when positioned in another position;
    said shutter including a metallic base;
    a coil of current conductive wire positioned in a plane parallel with said metallic base of said shutter and positioned adjacent thereto when in its normal position prior to operation;
    whereby an electrical discharge through said coil produces a magnetic field about said coil and a reverse current in the base of said shutter, resulting in movement of said shutter in a direction normal to the plane within which said coil is positioned.

2. An eddy current motivated shutter device as claimed in claim 1, wherein:
    said coil of current conductive wire is coaxial with said shutter element.

3. An eddy current motivated shutter device as claimed in claim 1 wherein:
    said device includes a shutter holding means for positively holding said shutter in its final position after being moved by the electrical discharge through said coil.

4. An eddy current motivated shutter device as claimed in claim 3 wherein:
    said holding means includes a dashpot type shutter stopping means.

5. An eddy current motivated shutter device as claimed in claim 3 wherein:
    said holding means includes a spring loaded ball type holding means.

References Cited

UNITED STATES PATENTS 3,191,516  6/1965  Corcoran _____ 95—59

JOHN M. HORAN, *Primary Examiner.*